United States Patent [19]

McManus

[11] Patent Number: 5,893,600
[45] Date of Patent: Apr. 13, 1999

[54] REGLAZABLE WINDOW

[75] Inventor: Armand McManus, Manhattan Bch., Calif.

[73] Assignee: Hehr International, Inc., Los Angeles, Calif.

[21] Appl. No.: 08/883,504

[22] Filed: Jun. 26, 1997

Related U.S. Application Data

[60] Provisional application No. 60/020,390, Jun. 27, 1996.

[51] Int. Cl.$^6$ ........................................ B60J 1/08
[52] U.S. Cl. .................. 296/146.16; 296/201; 296/96.2
[58] Field of Search ..................... 296/146.16, 146.15, 296/201, 96.2; 49/141, 501, 400, 397, 394; 52/204.62, 766

[56] References Cited

U.S. PATENT DOCUMENTS

| | | |
|---|---|---|
| 1,977,899 | 10/1934 | Shapiro et al. . |
| 2,371,430 | 3/1945 | De Patto ........................... 160/86 |
| 2,845,665 | 8/1958 | Place ................................ 49/397 |
| 2,889,900 | 6/1959 | Singleton ......................... 49/397 |
| 3,140,115 | 7/1964 | Bliss ................................. 296/95 |
| 3,266,560 | 8/1966 | Mooskian ......................... 160/368 |
| 3,312,023 | 4/1967 | Zell .................................. 52/203 |
| 3,656,798 | 4/1972 | Dodgen et al. .................. 296/23 |
| 3,704,563 | 12/1972 | Waller .............................. 52/455 |
| 3,923,339 | 12/1975 | McDonald ....................... 296/95 |
| 3,927,492 | 12/1975 | Carson ............................. 49/394 |
| 4,042,004 | 8/1977 | Kwan ............................... 49/501 |
| 4,196,545 | 4/1980 | Korany . |
| 4,280,414 | 7/1981 | Allshouse et al. .............. 109/49 |
| 4,331,359 | 5/1982 | Sheldon ........................... 296/146 |
| 4,399,347 | 8/1983 | Schmitt ............................ 219/203 |
| 4,474,403 | 10/1984 | Miller .............................. 296/96 |
| 4,562,666 | 1/1986 | Young, III ....................... 495/62 |
| 4,726,149 | 2/1988 | Tryba ............................... 49/465 |
| 4,763,454 | 8/1988 | Brockhaus ....................... 525/202 |
| 4,768,823 | 9/1988 | Martinez ......................... 296/95 |
| 4,811,982 | 3/1989 | Carlyle ............................ 296/95.1 |
| 4,825,609 | 5/1989 | Rundo ............................. 52/766 |
| 5,002,326 | 3/1991 | Westfield et al. ............... 296/95.1 |
| 5,103,591 | 4/1992 | Szymanski ...................... 49/141 |
| 5,230,180 | 7/1993 | Tweedt et al. .................. 49/400 |
| 5,242,207 | 9/1993 | Carson et al. ................... 296/146.1 |
| 5,577,355 | 11/1996 | Leonelli .......................... 52/204.62 |
| 5,643,915 | 7/1997 | Ackermann et al. ........... 49/141 |

FOREIGN PATENT DOCUMENTS

| | | |
|---|---|---|
| 233-821 | 8/1987 | European Pat. Off. ........... 52/204.62 |
| 925929 | 9/1953 | Germany .......................... 49/397 |
| 4009-348 | 9/1991 | Germany .......................... 296/201 |
| 4009-349 | 9/1991 | Germany .......................... 296/201 |
| 1166015 | 4/1967 | United Kingdom ............... 49/394 |
| 1185192 | 3/1970 | United Kingdom ............... 49/397 |

*Primary Examiner*—D. Glenn Dayoan
*Assistant Examiner*—Kiran Patel
*Attorney, Agent, or Firm*—Small Larkin, LLP

[57] ABSTRACT

A generally rectangular reglazable vehicle window comprising a window panel of two spaced frames with an edge seal around the periphery of the panel; an egress frame in which the window panel is mounted; and a backframe defining the opening in a vehicle wall, the egress frame being hinged along an upper side on the upper side of the backframe to swing outwardly when released by an egress handle. The window panel is mounted in the egress frame between a fixed abutment rim blocking inward movement of the panel, and a removable abutment rim that is formed integrally with a retainer ring extending around the egress frame between the panel and the backframe. The ring is wedge-shaped in cross-sections for ease of insertion and removal.

Screws threaded into the retainer ring from the periphery of the egress frame normally hold the ring and the removable rim in place, the heads of the screws being recessed into the edge of the egress frame so as to be covered when the frame is in the closed position and accessible for service and repair when the frame is in the open position. A lower hinge element covers the top of the retainer rim.

25 Claims, 5 Drawing Sheets

FIG. 3

27, 1996, which is incorporated herein by reference.

REGLAZABLE WINDOW

CROSS REFERENCE TO RELATED APPLICATION

This application claims the benefit of U.S. Provisional Application No. 60/020,390 filed on Jun. 27, 1996, which is incorporated herein by reference.

BACKGROUND OF THE INVENTION

A. Field of the Invention

The present invention relates generally to a reglazable window assembly of the type suitable for use on a motor vehicle such as a public bus or train. More specifically, the invention relates to a window assembly having a window panel surrounded by a window frame that may be removed from the motor vehicle to allow for the servicing or replacement of the window panel.

B. Discussion of Prior Art

Motor vehicles used for public transportation, such as buses and trains, often are subjected to vandalism by passengers. A particularly costly form of vandalism is the application of graffiti to the glass windows by the passengers, by scratching, painting or other means.

Typically, mass transit passenger windows are designed to provide: (1) the passengers with a view of the motor vehicle's route; (2) insulation to improve the efficiency of heating and cooling systems; and (3) safety features including safety glass and egress in the event of an accident. To these ends, the windows typically include a window panel of safety glass, often double-paned for insulation, surrounded by an egress frame that is constructed of metal and removably secured in an opening in the vehicle wall. The panel may include a seal, usually composed of rubber, that is fitted between the window glass and the egress frame. The seal prevents rattling of the glass within the frame and provides a tight insulating seal. In a conventional window construction, the opening in the vehicle wall is defined by a backframe secured to the vehicle structure and receiving the egress frame, which is hinged on the backframe for swinging outwardly away from the vehicle wall to an open position when released from the inside of the vehicle.

The vandalism performed upon mass transit windows can include graffiti carved into the window glass, thereby interfering with the view for later passengers, or removal of the seal from between the glass and the frame. Once a window has been vandalized, it is necessary to repair the window, and usually is necessary to replace it. The costs of repairing and replacing such windows is very high due both to the cost of the materials and the cost of labor. Presently, a damaged window of the conventional type must be removed and repaired away from the vehicle.

Attempts have been made to reduce the costs of such repair by covering the interior surfaces of the windows with protective sheets of replaceable material. Such sheets, known as "sacrificial panels", are typically secured to the frame by so-called "tamper-proof" brackets, which do not, in fact, provide total protection. Replacing the sheets is less costly than replacing the window glass. One such window having sacrificial panels is disclosed in U.S. Pat. No. 5,242,207.

While the sacrificial panels were initially thought to reduce the cost of vandalism, vandals more recently have been circumventing the sheets by cutting through them to the glass or by removing the retaining brackets. As a result, public transportation authorities still are burdened with the cost of replacing and/or repairing glass windows and seals. Thus, the need exists for an improved reglazable window that can be repaired and replaced with reduced labor and material costs.

OBJECTS AND SUMMARY OF THE INVENTION

It therefore is an object of the present invention to provide a reglazable vehicle window that reduces the cost of labor and materials to repair the window.

It is a further object of the present invention to provide a reglazable window that diminishes the damage caused by vandalism.

It is an advantage of the present invention that the window panel is mounted within a window frame that can be easily disassembled for repairs on-site to reduce labor costs and downtime for the vehicle.

It is an advantage of the present invention that disassembly of the window assembly by passengers within the motor vehicle is virtually impossible.

In accordance with the present invention, a reglazable window assembly is removably mounted in an egress frame in a novel manner that permits relatively easy access to and removal of the window panel by a person outside the vehicle when the window assembly is in an open position and the method of removal is known, but makes unauthorized removal from inside the vehicle virtually impossible, and makes removal from outside the vehicle by someone not familiar with the window assembly very difficult. In this way, servicing of the window assembly is facilitated while unauthorized removal by passengers is prevented.

More specifically, the window assembly of the invention has a window panel that normally is held in an egress frame against a permanent inside retaining ring that positively blocks inward movement of the panel, and is releasably secured in this position by a removable retaining ring that is inserted between the panel and the egress frame from the outer side of the window assembly and has a retainer flange that abuts against the outer side of the panel to hold it in place in the egress frame. The ring is held releasably in place by fasteners that extend into the ring from the outer peripheral edges of the egress frame with the outer ends of the fasteners concealed and positively blocked against access when the window is closed. When the window is moved into the open position, however, extending outwardly from the vehicle, the outer ends are accessible from outside the vehicle. A removable seal is provided to conceal the outer ends from view, as a further deterrent.

In the preferred embodiments shown herein for purposes of illustration, the retainer ring is of generally L-shaped cross-sectional shape, with one leg disposed between the peripheral edges of the window panel and the adjacent inside surface of the egress frame and filling the space between them, the ring being wedge-shaped and having opposed surfaces that converge inwardly to facilitate insertion and withdrawal of the ring. The second leg of the seal is a right-angle flange or rib that forms an outside rim that lies against the laterally outer side of the window panel, in opposed relation with the inside rim on the frame.

The preferred fasteners are screws that extend into the ring through the wall of the egress frame with the outer ends of the screws recessed in channels in the edges of the frame. The channels are closed by removable seals for concealing the screws.

The window panel includes a channel-shaped seal that is fitted over the peripheral edges of the glass panes disposed between the two retaining rims when the window assembly is in place. In an alternative embodiment, the window panel has a sacrificial panel covering the inside surface of the glass, and with the inside rim on the egress frame offset to overlie the margins of the panel.

BRIEF DESCRIPTION OF THE DRAWINGS

Other objects, advantages, and features of the invention will become apparent from the following detailed description taken in connection with the accompanying drawings, in which.

DESCRIPTION OF THE PREFERRED EMBODIMENT

Figure 1:
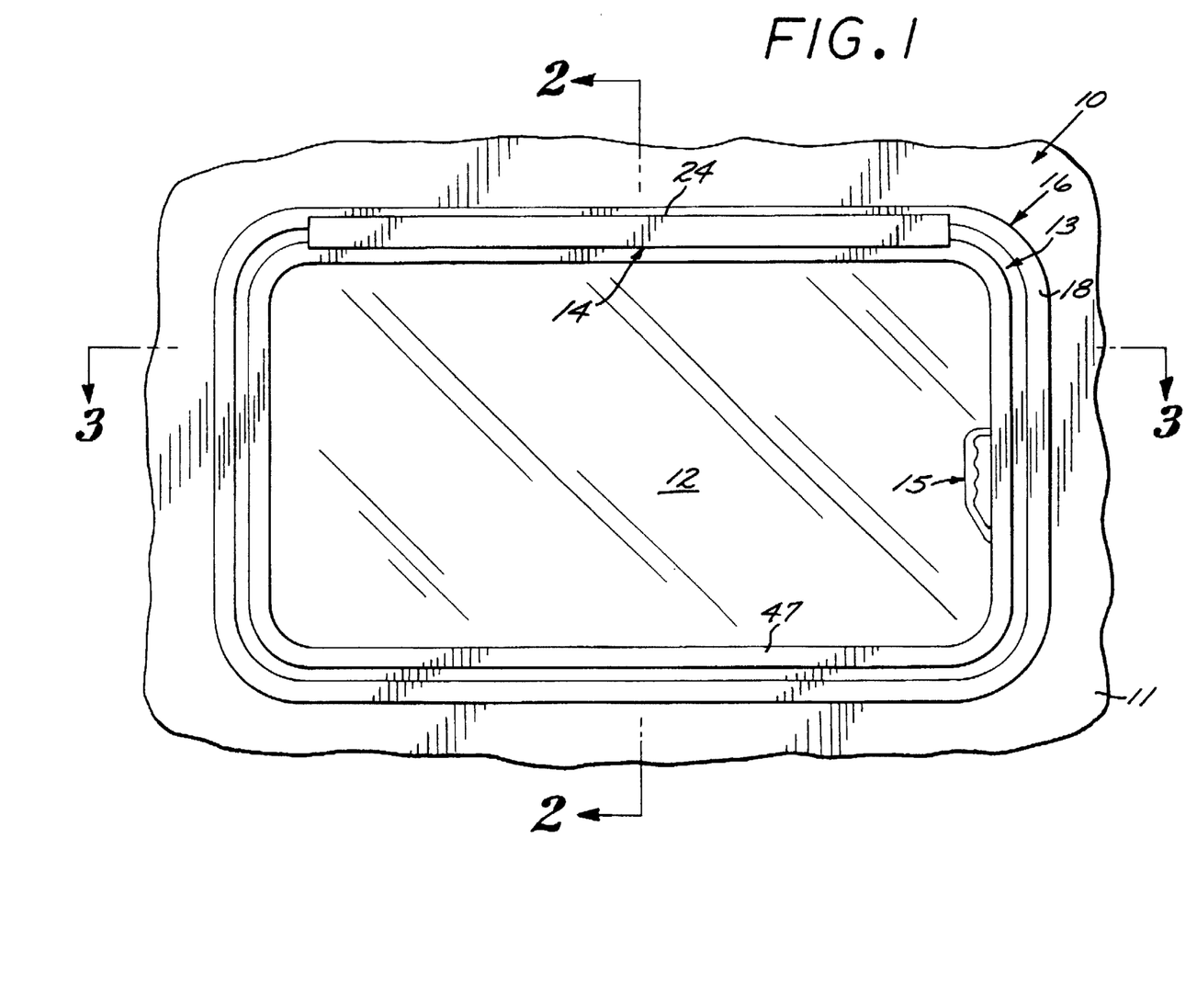
FIG. 1 is a side elevational view of a reglazable vehicle window assembly of the present invention.

As shown in the drawings for purposes of illustration, the invention is embodied in a vehicle window assembly, indicated generally by the reference number 10, that is mounted in a wall 11 such as an upright wall of a motor vehicle such as a bus or train, and comprising generally a generally rectangular transparent window panel 12 that is mounted in a frame 13 set into the wall 11. To permit escape from the vehicle during an emergency and for other purposes, the frame 13 is movably supported in the vehicle wall 11 on a hinge, indicated generally at 14, extending along the upper side of the window and supporting the frame 13 for swinging outwardly about a hinge axis that extends along the upper side of the frame. This frame is referred to hereinafter as the "egress frame." An inside "egress" handle 15 (FIG. 1) is provided for opening the window, in a conventional manner.

Figure 2:
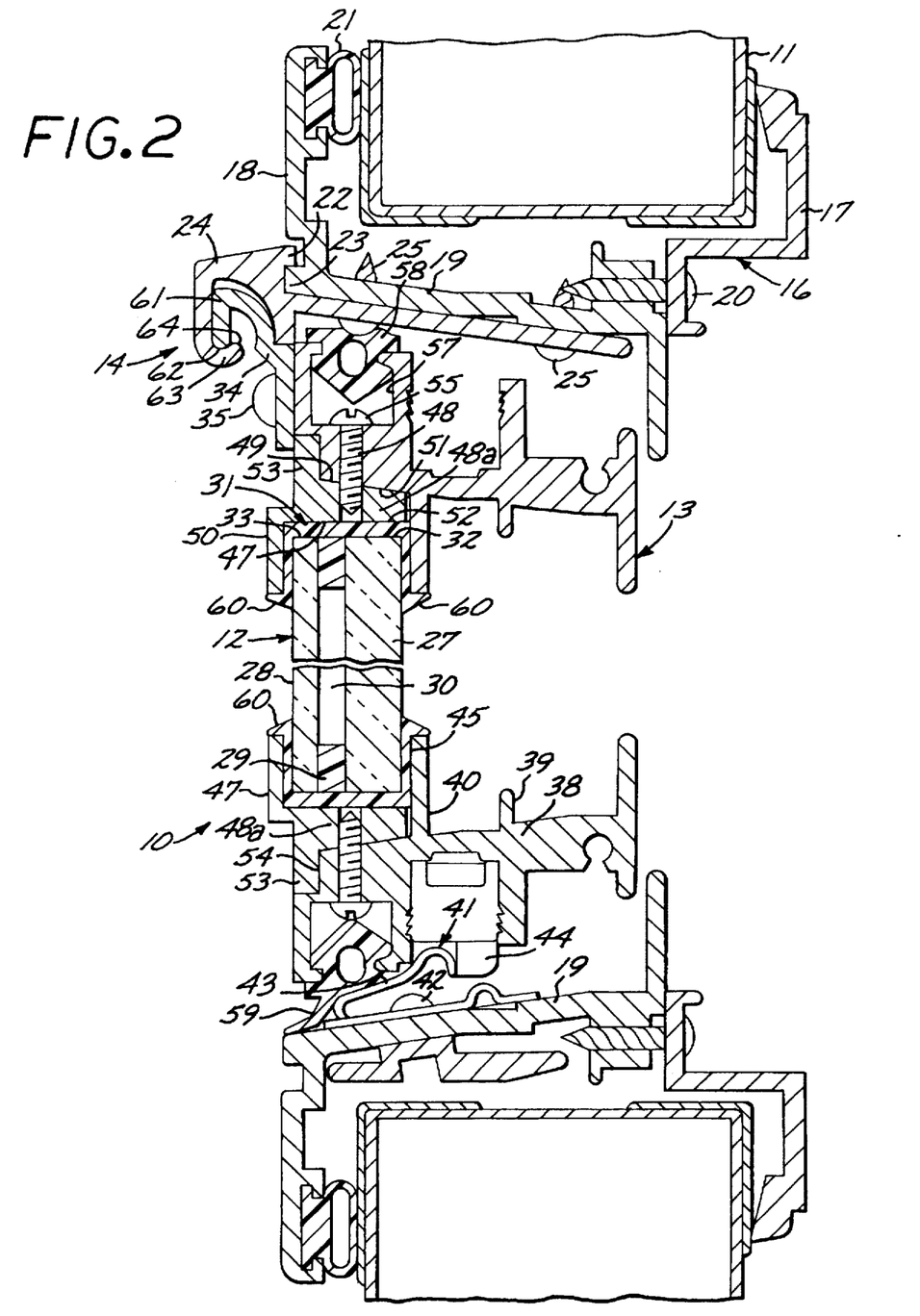
FIG. 2 is a cross-sectional view taken along line 2—2 of FIG. 1 with the central portion removed for compactness.
Figure 3:
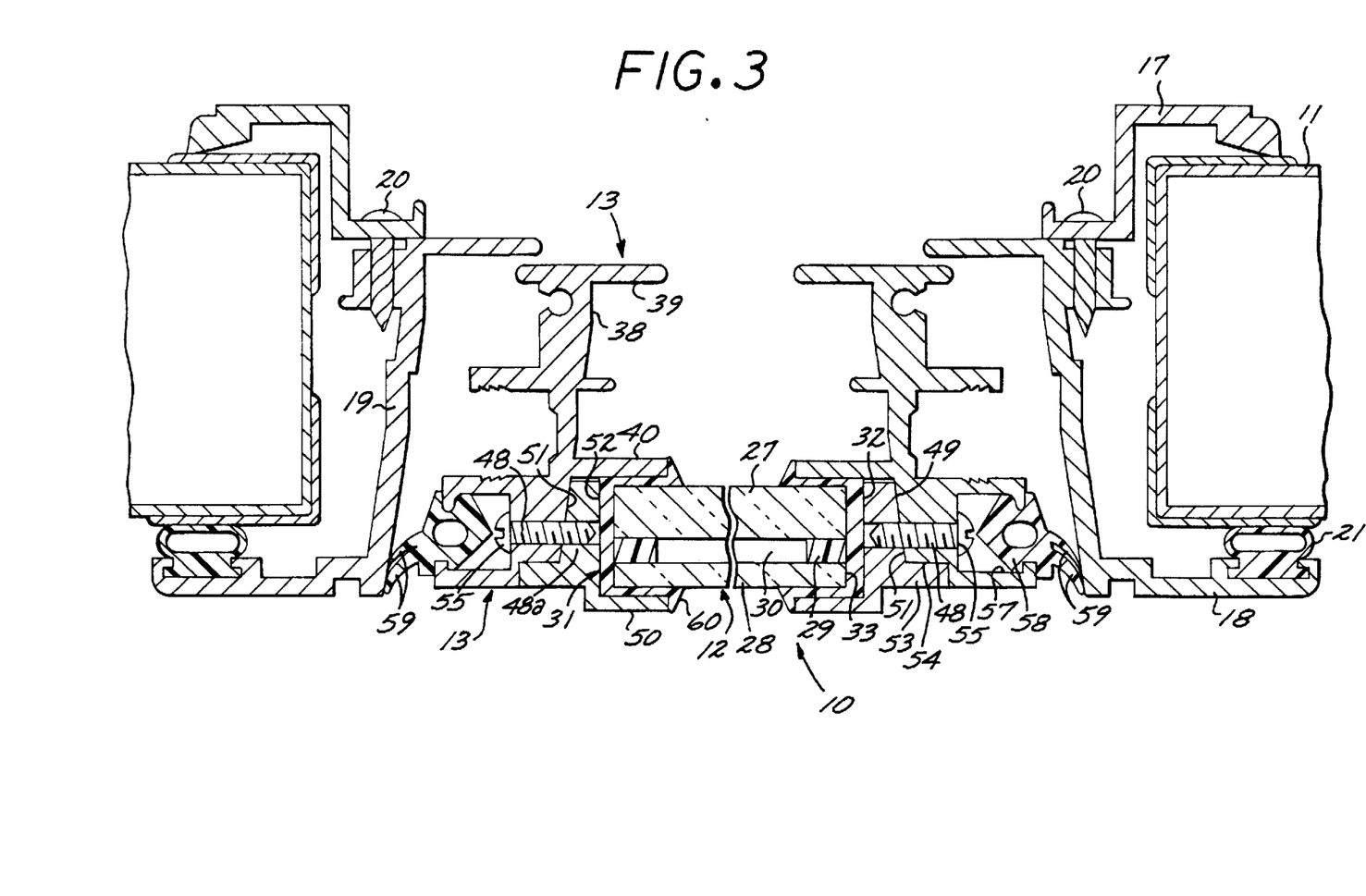
FIG. 3 is a cross-sectional view taken along line 3—3 of FIG. 1, also with the central portion removed.

The egress frame 13 is mounted in a basically conventional manner in the vehicle wall 11, which is shown in FIGS. 2 and 3 as being of hollow sheet-metal construction, in a second frame 16 that defines a generally rectangular opening in the vehicle wall. This frame is referred to as the "backframe", and is made up in the illustrative embodiment of inner and outer peripheral rings 17 and 18 (see FIG. 2) that overhang the vehicle wall around the opening, the outer ring having an integral crosspiece 19 to which the inner ring 17 is connected by screws 20 from the inside. A ring of weather stripping 21 is clamped between the outer ring 18 and the vehicle wall, and the upper member 24 of the hinge 14 is secured to the outer ring 18 by means of interfitting ribs 22 and 23 (see FIG. 2) and screws 25 connecting the hinge member to the crosspiece 19 of the backframe.

It is to be understood that the foregoing components are basically conventional, and may be replaced by other conventional components, and provided in other shapes than rectangular. Further, the window panel 12 may take various conventional forms, typically comprising one or two panes of glass that are set into the egress frame and secured in place in the frame. Herein, two spaced panes 27 and 28 are shown in the panel, separated by a peripheral band 29 of sealant so as to provide an insulating air gap 30 in the window. A channel-shaped peripheral seal 31 is fitted over the edges 32 and 33 of the glass panes and forms the outer peripheral boundary of the window panel 12.

Figure 4:
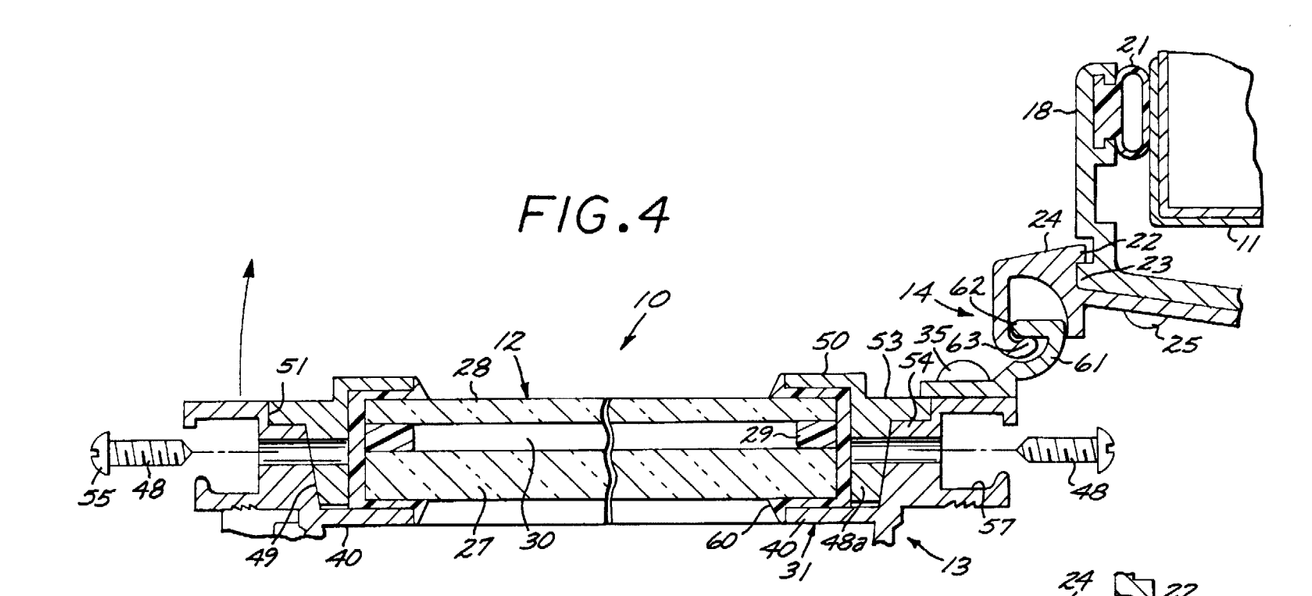
FIGS. 4 and 5 are fragmentary cross-sectional views constituting portions of FIG. 2 with parts in moved, generally horizontal, positions and illustrating the disassembly of the window.
Figure 5:
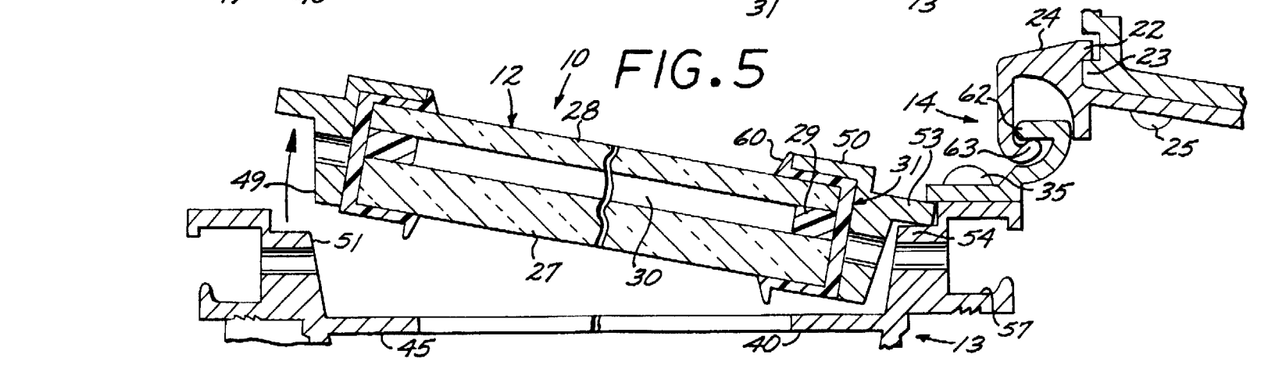

As can best be seen in FIG. 2, the hinge 14 has a lower hinge member 34 that is attached to the outer side of the egress frame, for example by a series of rivets 35 along the upper edge of the egress frame 13, one rivet being shown in FIG. 2. The egress frame also may be of basically conventional construction, being made of extruded metal and having an outer portion housing the window panel and an inner portion, indicated generally at 38, which forms the inner side of the window assembly and has a slot 39 that defines an inside track for purposes having nothing to do with the present invention. A second slot 40 is provided in the extrusion to mount the egress handle 15 in a conventional manner (not shown), for release of a conventional spring detent 41 along the lower side of the egress frame. This detent has a base that is riveted at 42 to the backframe crosspiece 19, and a resiliently yieldable free end portion 43 that is releasably engaged in a blocking position, shown in FIG. 2, with a release arm 44 carried by the egress frame 13. The egress handle 15, when manipulated from inside the vehicle 11, moves the release arm out of the blocked position and thus releases the lower side of the egress frame for outward swinging from the closed position shown in FIG. 1 toward an open position, as shown in FIGS. 4 and 5. On swinging of the egress frame back toward the closed position, the release arm 44 cams the spring detent downward to permit the window to close, the detent then snapping back into the blocking position.

In accordance with one aspect of the present invention, the window panel 12 is mounted in the egress frame 13 in a novel manner to be held securely in place and protected against unauthorized removal from the inside by passengers, while being conveniently accessible and removable for service and repair from the outside when open, thereby making possible substantial savings in the cost of labor and materials. For these purposes, the window panel is confined in the egress frame between a fixed retaining rim 45 in the form of a rib or flange that extends around the window opening on the inner side of the egress frame 13 to overlie the peripheral portion of the inner lateral side of the panel, and a removable retaining rim 47 that extends around the outer lateral side of the peripheral portion of the panel in opposed relation with the rim 45, and is secured in place by concealed fasteners 48 that are not accessible by passengers in the vehicle. These fasteners are readily accessible by service personnel when the egress frame is in the open position or removed from the vehicle, and permit easy removal and servicing of the window panel.

The removable retaining rim 47 of the invention may be identical in composition and appearance to the inside rim 45 and is formed as a right-angle flange or rib on a retainer ring 48a that is fitted between the outer peripheral edge of the window panel and the inside surface 46 of the backframe. This ring is wedge-shaped in cross-section, with side surfaces 49 and 50 that converge inwardly to taper the thickness of the ring for ease of insertion and removal, and the opposing surfaces 51 and 52 of the backframe and the window panel are complementary in shape. The surfaces are the inner surface of the backframe and the outer edge of the seal, respectively. The retaining rim 47 projects inwardly from the thicker end of the ring and partially over the margins of the pane 28, and a locating rib 53 projects outwardly in the opposite direction, to lie against a laterally outwardly facing shoulder 54 on the egress frame.

To conceal the fasteners 48, which herein are a series of screws threaded into the retaining ring 48a through the egress frame, the heads 55 of the screws are recessed into the outer peripheral sides of the egress frame 13, herein in a peripheral channel 57 in the frame, and the open outer side of the channel is closed by a removal seal 58. This seal is composed of resiliently compressible material and is held in place by detent ribs on the sides of the channel. Herein, it has resiliently flexible sealing fingers 59 on three sides (other than the hinged side) for sealing engagement with the walls of the backframe 16. When this seal 58 is in place, the screw heads 55 are not visible, even when the egress frame is in the open position. It can be easily removed from the channel 57, however, to provide access to the screws with a suitable tool (not shown).

Removal of the screws is illustrated in FIG. 4, with the egress frame and the window panel 12 in substantially horizontal open positions. Removal of the panel from the egress frame is illustrated in FIG. 5, in which the panel is simply tilted away from the frame. It will be seen in FIG. 5 that the locating rib 53 normally lies beneath a base strip of the lower hinge member 34, and is clamped against the egress frame, but can be withdrawn for removal of the window panel. Upon re-insertion, the rib is fitted under the base strip before the panel is swung back into place. Preferably, ribs 60 on the edges of the seal 31 overlie the free edges of the retaining rims 45 and 47.

The hinge 14 is designed to mount the egress frame 13 for swinging movement through a wide range of normal movement, substantially more than ninety degrees from the closed position, as can be seen by comparing FIG. 2 with FIGS. 4 and 5, and then to release the egress frame for removal from the vehicle upon further swinging. For these purposes, the lower hinge element 34 has an upper edge portion 61 which is a channel of inverted J-shaped cross-section with a free edge 62 that faces downwardly when the egress frame is in the closed position, and the upper hinge element 24 has an upper, overhanging wall extending outwardly from the backframe 16 and a depending sidewall with an inward curl 63 on its free edge portion, forming a backward J-shaped cross-section with an upwardly directed free edge 64. The free edge portions interfit as shown in the drawings, to hang or suspend the egress frame from the upper hinge element and permit swinging of the frame to the open position for egress, when required.

Figure 6:
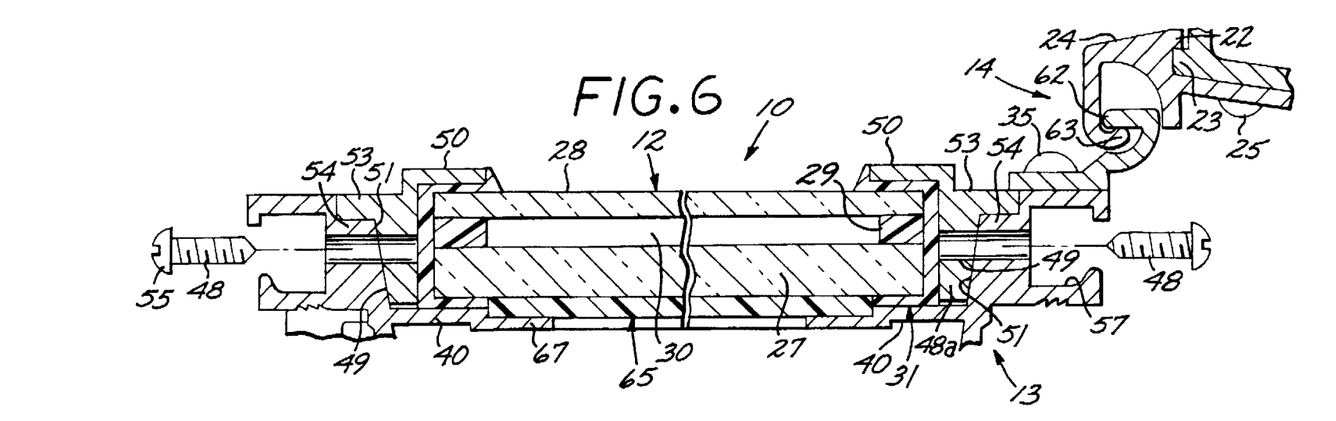
FIGS. 6 and 7 are cross-sectional views similar to FIGS. 4 and 5 but showing an alternative embodiment of the present invention and illustrating the disassembly of a window assembly incorporating a protective sacrificial panel.
Figure 7:
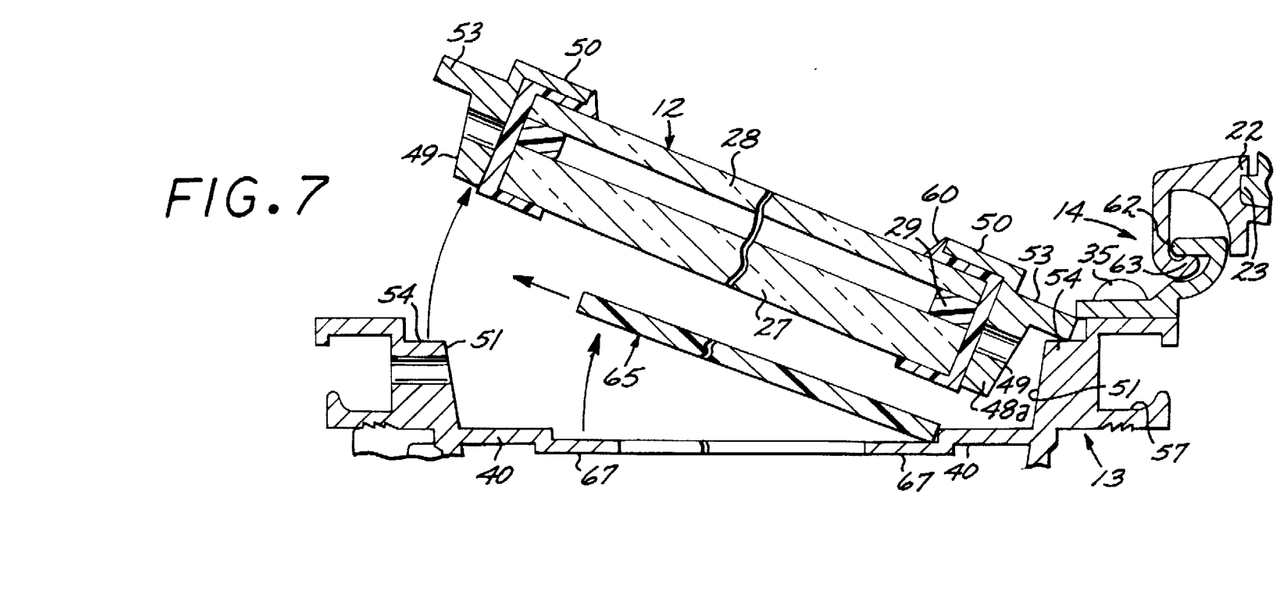

Shown in FIGS. 6 and 7 is an alternative embodiment of the invention in which a protective sacrificial covering 65 is applied to the inner side of the window panel 12. In these figures, corresponding parts are indicated by the same reference numbers used in connection with the first embodiment, the principal differences being the sacrificial covering 65, which preferably is an acrylic panel that covers the inner window pane 37 and has a peripheral edge or marginal portion that lies under a free edge portion 67 of the inside retaining rim 38. The free edge portion is offset laterally inwardly to cover and protect the acrylic panel 65, as shown in FIG. 6, the panel being easily removed when the egress frame 13 is open as shown in FIG. 7.

From the foregoing, it will be readily apparent to those skilled in the art that the window assembly is capable of reducing the labor costs for repairing such windows and reduces the material costs by deterring vandalism from being performed upon the window assembly components.

While the present invention has been described in connection with what are presently considered to be the most practical and preferred embodiments, it is to be understood that the invention is not to be limited to the disclosed embodiments, but to the contrary, is intended to cover various modifications and equivalent arrangements included within the spirit of the invention, as set forth in the appended claims, and which scope is to be accorded the broadest interpretation so as to encompass all such modifications and equivalent structures.

I claim:

1. A reglazable window assembly adapted to be mounted in a wall opening of predetermined size and shape in an upright vehicle wall, comprising:

a frame having an outer side sized and shaped to fit closely within the wall opening and having inner side surfaces defining a window opening of generally rectangular shape;

a window panel of the same generally rectangular shape as the window opening and sized to fit loosely within the window opening with a predetermined clearance between the periphery of the window panel and said inner side surfaces;

a first inwardly extending flange on said frame around said window opening in abutting engagement with one lateral side of said window panel around the periphery thereof to form a first rim for preventing displacement of the window from the frame toward said one lateral side;

a generally rectangular ring disposed between inner side surfaces of said frame and the periphery of said window panel and having an inner peripheral side engaging said periphery and an outer peripheral side engaging said inner side surfaces of the frame, the peripheral sides of said ring converging toward said rim to permit lateral withdrawal of the ring away from the rim;

a second inwardly extending flange on said ring around said window opening in abutting engagement with said window panel around the periphery thereof on the lateral side thereof opposite said first flange, thereby forming a second rim to hold the window panel in said window opening;

fasteners extending through said frame from the outer side thereof and into said ring to secure the ring releasably in place on the frame, said fasteners having outer ends positioned to be covered by said wall when the frame is in the wall opening;

hinge means extending along the upper side of said frame and mounting said frame in said wall opening for swinging movement of the frame out of the opening for access to the fasteners;

and latch means for releasably securing said frame in said wall opening.

2. A window assembly as defined in claim 1 wherein said fasteners have outer ends recessed into the outer side of said frame, and further including removable covering means for concealing said outer ends when said frame is in said open position.

3. A window assembly as defined in claim 2 wherein said fasteners are screws having heads disposed in a channel in the outer side of said frame, and said removable covering means is a seal removably mounted in said channel.

4. A window assembly as defined in claim 1 wherein said window panel comprises two panes of glass secured together in spaced relationship to form an insulating gap between them.

5. A window assembly as defined in claim 4 wherein said panel also includes a channel-shaped edge seal extending entirely around said panes of glass and engaging said first rim on one side of said panel and engaging said second rim on the other side of said panel.

6. A window assembly as defined in claim 1 wherein said window panel comprises a pane of glass having a protective layer of sacrificial material overlying the pane of glass on said one side thereof and covering all of said one side except a narrow exposed band around the periphery of the glass, said first rim having an outer portion overlying and engaging said narrow band and an offset inner portion overlying and engaging a peripheral portion of the protective layer.

7. A window assembly as defined in claim 1 wherein said frame has a substantially flat side and said means mounting said frame for movement out of said wall opening comprise first and second hinge members defining a hinge axis along said flat side for swinging of the frame between the open and closed positions, said first hinge member being mounted on said frame along said flat side and said second hinge member being mountable on said wall along said flat side.

8. A window assembly as defined in claim 7 wherein said hinge members constitute interfitting arcuate channels that are shaped to remain hingedly engaged when the frame is in the closed position and for a preselected amount of swinging away from the closed position, and then to become disengaged for removal of the frame from the wall.

9. A window assembly as defined in claim 8 wherein said first hinge element has a first elongated, flat base strip attached to said frame, and an elongated first channel strip curving outwardly and away from the base strip and having a hook-like free edge portion spaced from the base strip; and said second hinge element has an elongated base strip disposed in side-by-side relation with said first flat base strip, a hinge leaf extending outwardly over the channel strip, and a hook-like free edge portion defining a channel in which said first channel strip is disposed, said hook-like free edges being shaped to remain engaged for ninety degrees of swinging of the frame away from said closed position.

10. A reglazable window assembly adapted to be mounted in a wall opening of predetermined size and shape in an upright wall comprising:

a frame having an outer side sized and shaped to fit closely within the wall opening and having inner side surfaces defining a window opening of generally rectangular shape;

a window panel of the same generally rectangular shape as the window opening and sized to fit loosely within the window opening with a predetermined clearance between the periphery of the window panel and said inner side surfaces;

a first inwardly extending rim on said frame around said window opening in abutting engagement with one lateral side of said window panel around the periphery thereof to prevent displacement of the window from the frame toward said one lateral side;

a generally rectangular ring disposed between inner side surfaces of said frame and the periphery of said window panel and having an inner peripheral side engaging said periphery and an outer peripheral side engaging said inner side surfaces of the frame, the peripheral sides of said ring converging toward said rim to permit lateral withdrawal of the ring away from the rim;

a second inwardly extending rim on said ring around said window opening in abutting engagement with said window panel around the periphery thereof on the lateral side thereof opposite said first rim, thereby to hold the window panel in said window opening; and selectively releasable fasteners extending through said frame from the outer side thereof and into said ring to secure the ring and said second rim releasably in place on the frame, said fasteners having outer ends positioned to be covered by said wall when the frame is in the wall opening.

11. A reglazable window assembly adapted to be mounted in a wall defining a wall opening for the window assembly having:

a frame having an outer side sized and shaped to fit closely within the wall opening and an inner side defining a window opening of preselected size and shape;

a window panel of generally the same shape disposed within said window opening and having a peripheral edge extending along said inner side in spaced relation therewith;

first abutment means carried by said frame and engaging one side of said window panel to block movement of the panel toward said one side;

a removable retainer ring normally disposed in said opening between said window panel and said inner side and extending around said peripheral edge;

second abutment means carried by said retainer ring and engaging the opposite side of said panel from said one side, thereby to hold the panel within said frame when said ring is in place;

said retainer ring being movable out of said frame away from said panel and said first abutment means to release said panel for removal from said frame; and fasteners extending through said frame from the outer side thereof into said opening and into said retainer ring to hold the ring normally in place in the opening, said fasteners being removable from said outer side of said frame to release said ring.

12. A window assembly as defined in claim 11 wherein said first abutment means comprises a rim on said frame extending around said frame opening and overlying the peripheral edge portion of said panel to block movement of the panel toward said one side.

13. A window assembly as defined in claim 12 wherein said frame rim is formed integrally with the frame to extend partially into the frame opening.

14. A window assembly as defined in claim 11 wherein said second abutment means comprises a second rim on said retainer ring extending around the peripheral edge portion of said panel on the side thereof opposite said first abutment means.

15. A window assembly as defined in claim 14 wherein said retainer rim is formed integrally with the retainer ring as a substantially right-angle flange thereon.

16. A window assembly as defined in claim 11 wherein said fasteners have outer ends recessed into the outer side of said frame, and further including removable covering means for concealing said outer ends when said frame is in said open position.

17. A window assembly as defined in claim 16 wherein said fasteners are screws having heads disposed in a channel in the outer side of said frame, and said removable covering means is a seal removably mounted in said channel.

18. A window assembly as defined in claim 11 wherein said frame and said retainer ring have opposed surfaces disposed in tight sealing engagement when the ring is in place around the panel, said ring tapering in thickness toward said one side for ease of insertion in and removal from the frame opening.

19. A window assembly as defined in claim 18 wherein said retainer ring has a second flange extending outwardly to overlie said frame around the opening.

20. A window assembly as defined in claim 11 wherein said window panel comprises two panes of glass secured together in spaced relationship to form an insulating gap between them.

21. A window assembly as defined in claim 20 wherein said panel also includes a channel-shaped edge seal extending entirely around said panes of glass and engaging said first abutment means on one side of said panel and engaging said second abutment means on the other side of said panel.

22. A window assembly as defined in claim 11 wherein said window panel comprises a pane of glass having a protective layer of sacrificial material overlying the pane of glass on said one side thereof and covering all of said one side except a narrow exposed band around the periphery of the glass, said abutment means being a rim having an outer portion overlying and engaging said narrow band and an offset inner portion overlying and engaging a peripheral portion of the protective layer.

23. A window assembly as defined in claim 11 wherein said frame has a substantially flat side and said means mounting said frame for movement out of said wall opening comprise first and second hinge members defining a hinge axis along said flat side for swinging of the frame between the open and closed positions, said first hinge member being mounted on said frame along said flat side and said second hinge member being mountable on said wall along said flat side of the frame.

24. A window assembly as defined in claim 23 wherein said hinge members constitute interfitting arcuate channels that are engaged when the frame is in the closed position and for a preselected amount of swinging away from the closed position, and then become disengaged for removal of the frame from the wall.

25. A window assembly as defined in claim 24 wherein said first hinge element has a first elongated base strip attached to said frame, and an elongated first channel strip curving outwardly and away from the base strip and having a hook-like free edge portion spaced from the base strip; and said second hinge element has an elongated base strip disposed in side-by-side relation with said flat base strip, a hinge leaf extending outwardly over the channel strip, and a hook-like free edge portion defining a channel in which said first channel strip is disposed, said hook-like free edges being shaped to remain engaged for ninety degrees of swinging of the frame away from said closed position.

* * * * *